US011936118B2

(12) United States Patent
Zhou et al.

(10) Patent No.: US 11,936,118 B2
(45) Date of Patent: Mar. 19, 2024

(54) ANTENNA SYSTEM AND NETWORK DEVICE

(71) Applicant: New H3C Technologies Co., Ltd., Zhejiang (CN)

(72) Inventors: Guojun Zhou, Beijing (CN); Peikun Yang, Beijing (CN)

(73) Assignee: NEW H3C TECHNOLOGIES CO., LTD., Zhejiang (CN)

( * ) Notice: Subject to any disclaimer, the term of this patent is extended or adjusted under 35 U.S.C. 154(b) by 356 days.

(21) Appl. No.: 17/427,614

(22) PCT Filed: Jan. 20, 2020

(86) PCT No.: PCT/CN2020/073211
§ 371 (c)(1),
(2) Date: Jul. 30, 2021

(87) PCT Pub. No.: WO2020/156322
PCT Pub. Date: Aug. 6, 2020

(65) Prior Publication Data
US 2022/0102854 A1 Mar. 31, 2022

(30) Foreign Application Priority Data
Jan. 30, 2019 (CN) ......................... 201910093105.9

(51) Int. Cl.
*H01Q 3/02* (2006.01)
*H01Q 1/22* (2006.01)
(Continued)

(52) U.S. Cl.
CPC ................. *H01Q 3/02* (2013.01); *H01Q 1/22* (2013.01); *H01Q 1/246* (2013.01); *H01Q 3/06* (2013.01)

(58) Field of Classification Search
CPC ............ H01Q 3/02; H01Q 1/22; H01Q 1/246; H01Q 3/06
(Continued)

(56) References Cited

U.S. PATENT DOCUMENTS 5,777,578 A 7/1998 Chang et al.
7,400,956 B1 * 7/2008 Feller .................. G05D 1/0278 701/470
(Continued)

FOREIGN PATENT DOCUMENTS

CN 1638189 A 7/2005
CN 101542840 A 9/2009
(Continued)

OTHER PUBLICATIONS

State Intellectual Property Office of the People's Republic of China, Decision of Rejection Issued in Application No. 201910093105.9, dated Aug. 4, 2021, 19 pages. (Submitted with Machine/Partial Translation).
(Continued)

*Primary Examiner* — Hai V Tran
(74) *Attorney, Agent, or Firm* — McCoy Russell LLP

(57) ABSTRACT

Provided are an antenna system and a network device. In an example, the antenna system includes at least one antenna unit and a control apparatus configured to control the at least one antenna unit to rotate, wherein the control apparatus is connected with the at least one antenna unit and an external control device, receives a rotation instruction from the external control device, and controls the at least one antenna unit to rotate to a target angle according to the received rotation instruction.

10 Claims, 3 Drawing Sheets

(51) Int. Cl.
*H01Q 1/24* (2006.01)
*H01Q 3/06* (2006.01)

(58) Field of Classification Search
USPC .......................................................... 343/766
See application file for complete search history.

(56) References Cited

U.S. PATENT DOCUMENTS

| | | | | |
|---|---|---|---|---|
| 8,686,900 | B2 * | 4/2014 | Whitehead | G01S 19/43 342/357.34 |
| 9,880,562 | B2 * | 1/2018 | Webber | G01S 19/14 |
| 2007/0262911 | A1 * | 11/2007 | Kim | H01Q 3/20 343/757 |
| 2012/0280874 | A1 * | 11/2012 | Kim | H01Q 3/06 343/763 |
| 2013/0120202 | A1 | 5/2013 | Lever et al. | |

FOREIGN PATENT DOCUMENTS

| | | | |
|---|---|---|---|
| CN | 101847784 | A | 9/2010 |
| CN | 103022693 | A | 4/2013 |
| CN | 103474771 | A | 12/2013 |
| CN | 203733925 | U | 7/2014 |
| CN | 105337875 | A | 2/2016 |
| CN | 105576374 | A | 5/2016 |
| CN | 205830047 | U | 12/2016 |
| CN | 106374222 | A | 2/2017 |
| CN | 106410363 | A | 2/2017 |
| CN | 107689478 | A | 2/2018 |
| CN | 207441969 | U | 6/2018 |
| CN | 108711682 | A | 10/2018 |
| JP | 2009519668 | A | 5/2009 |
| JP | 2013514033 | A | 4/2013 |
| WO | 2018082072 | A1 | 5/2018 |

OTHER PUBLICATIONS

ISA State Intellectual Property Office of the People's Republic of China, Written Opinion of the International Searching Authority Issued in Application No. PCT/CN2020/073211, dated Apr. 17, 2020, WIPO, 8 pages.

European Patent Office, Extended European Search Report Issued in Application No. 20749695.1, dated Jan. 25, 2022, Germany, 9 pages.

State Intellectual Property Office of the People's Republic of China, Office Action and Search Report Issued in Application No. 201910093105.9, dated Feb. 28, 2022, 13 pages.(Submitted with Machine Translation).

State Intellectual Property Office of the People's Republic of China, Office Action and Search Report Issued in Application No. 201910093105.9, dated Jun. 28, 2022, 13 pages. (Submitted with Machine Translation).

Japanese Patent Office Action, Office Action Issued in Application No. 2021-543217, dated Aug. 2, 2022, 4 pages. (Submitted with Machine Translation).

ISA State Intellectual Property Office of the People's Republic of China, International Search Report Issued in Application No. PCT/CN2020/073211, dated Apr. 17, 2020, WIPO, 4 pages.

State Intellectual Property Office of the People's Republic of China, Office Action and Search Report Issued in Application No. 201910093105.9, dated Jul. 31, 2020, 13 pages. (Submitted with Machine/Partial Translation).

State Intellectual Property Office of the People's Republic of China, Office Action and Search Report Issued in Application No. 201910093105.9, dated Mar. 2, 2021, 15 pages. (Submitted with Machine/Partial Translation).

State Intellectual Property Office of the People's Republic of China, Office Action and Search Report Issued in Application No. 201910093105.9, dated Oct. 27, 2022, 11 pages. (Submitted with Machine/Partial Translation).

* cited by examiner

ANTENNA SYSTEM AND NETWORK DEVICE

CROSS REFERENCE TO RELATED APPLICATIONS

The present application is a U.S. National Phase of International Application No. PCT/CN2020/073211 entitled "ANTENNA SYSTEM AND NETWORK DEVICE," and filed on Jan. 20, 2020. International Application No. PCT/CN2020/073211 claims priority to Chinese Patent Application No. 201910093105.9 filed on Jan. 30, 2019. The entire contents of each of the above-listed applications are hereby incorporated by reference for all purposes.

TECHNICAL FIELD

The present disclosure relates to network communication technologies, and in particular to an antenna system and a network device.

BACKGROUND AND SUMMARY

A smart antenna works based on the following principle: a main wave beam of the antenna is aimed in an arrival direction of a mobile terminal signal, and a side lobe or a zero direction is aimed in an arrival direction of an interference signal, to achieve the purposes of fully and efficiently utilizing the mobile terminal signal and deleting or suppressing the interference signal.

BRIEF DESCRIPTION OF THE FIGURES

The accompanying drawings, which are incorporated in and constitute a part of the present specification, illustrate examples consistent with the present disclosure and serve to explain the principles of the present disclosure together with the specification.

DETAILED DESCRIPTION

At present, a smart antenna mainly includes beam switching antenna and a self-adaptive antenna array.

The beam switching antenna includes a plurality of narrow beam antennas. The narrow beam antenna herein refers to an antenna with a beam width of a radiation pattern being smaller than a preset beam width. Each narrow beam antenna in the beam switching antenna has a large gain and covers a distant range. One narrow beam antenna or one group of narrow beam antennas in the beam switching antenna may be selected to provide services (that is, in a working state) for each user. When the user is changed or a location of the user is changed, the one or more narrow beam antennas previously providing services for the user are turned off, and at least one narrow beam antenna which is previously off is turned on to provide services for the user. Radiation angles of the beam switching antenna are equivalent to the number of narrow beam antennas constituting the beam switching antenna. However, due to limitation of hardware design, the number of narrow beam antennas constituting the beam switching antenna is not large. In this case, it is impossible for the beam switching antenna to have many switchable radiation angles and thus the control of a radiation direction of the beam switching antenna is limited.

The self-adaptive antenna array is formed by a plurality of antennas. During working, the self-adaptive antenna array can calculate an optimal antenna combination manner by using a signal processing system according to a working environment and a user location. By controlling different antennas to work in the calculated optimal antenna combination manner, the self-adaptive antenna array may adapt to different working environments and different user locations and may also avoid unnecessary interferences. Although the self-adaptive antenna array realizes a plurality of radiation directions in different antenna combination manners, it is required to determine the antenna combination manner with the help of a special signal processing system, resulting in high costs.

Figure 1:
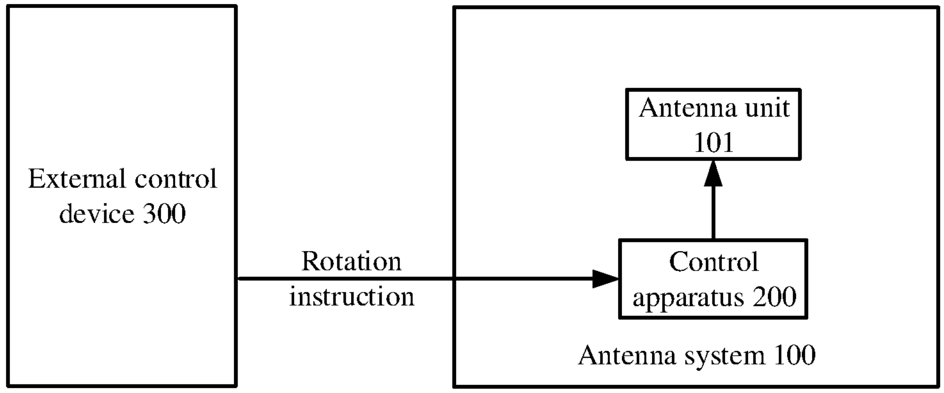
FIG. 1 is a schematic diagram illustrating an antenna system according to an example of the present disclosure.

To solve the above defects of the beam switching antenna and the self-adaptive antenna array, an example of the present disclosure provides an antenna system shown in FIG. 1. The antenna system may be applied to a network device, and the network device herein may be, for example, an Access Point (AP).

The antenna system 100 shown in FIG. 1 mainly includes an antenna unit 101 and a control apparatus 200 configured to control the antenna unit 101 to rotate.

In an example, the antenna unit 101 may include one antenna applied to a Single-Input Single-Output (SISO) system or a plurality of antennas applied to a Multiple-Input Multiple-Output (MIMO) system.

The control apparatus 200 is connected with the antenna unit 101 and an external control device 300 respectively. The control apparatus 200 receives a rotation instruction from the external control device 300 and controls the antenna unit 101 to rotate to a target angle according to the received rotation instruction. In an example, the external control device 300 herein may be a processor in the above network device, where the processor may be a Central Processing Unit (CPU).

It can be seen that, in the present disclosure, the control apparatus 200 controls the antenna unit 101 to rotate so as to change a radiation direction of the antenna unit 101, thereby switching a plurality of radiation angles of the antenna unit.

Further, in the present disclosure, the control apparatus 200 controls the antenna unit 101 to rotate and it is not required to realize a plurality of radiation directions by adding a narrow beam antenna. Compared with the beam switching antenna, the antenna system can realize more radiation directions with fewer antennas (antenna groups) to achieve an effect of a smart antenna.

Further, in the present disclosure, the control apparatus 200 controls the antenna unit 101 to rotate, and it is not required to calculate the optimal antenna combination manner for realizing a plurality of radiation directions with the help of the special signal processing system. Compared with the self-adaptive antenna array, the cost is greatly reduced.

Figure 2:
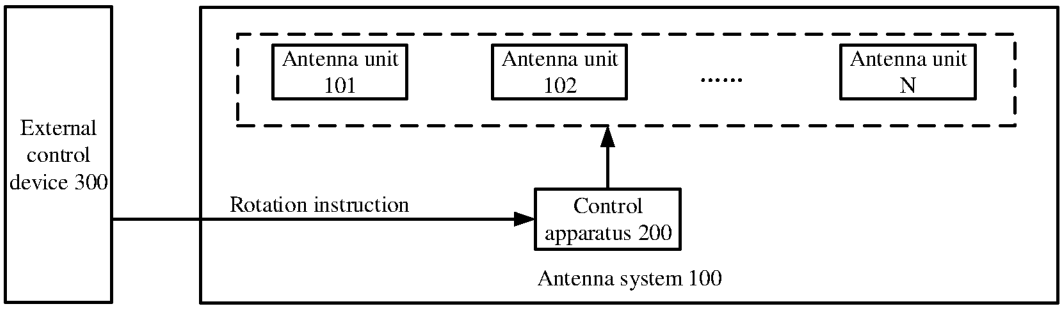
FIG. 2 is another schematic diagram illustrating an antenna system according to an example of the present disclosure.

FIG. 1 illustrates an antenna system 100 including only one antenna unit 101 according to an example of the present disclosure. In a specific implementation, the number of antenna units in the antenna system 100 may be greater than or equal to 1, which may be specifically preset according to actual requirements and scenario spaces. For example, if it is determined that the antenna system 100 may accommodate 10 antenna units at most according to the actual requirements and scenario spaces, the number of antenna units in the antenna system 100 is smaller than or equal to 10. FIG. 2 illustrates an antenna system 100 including N antenna units according to an example of the present disclosure.

It is to be noted that when the number of antenna units 101 in the antenna system 100 is greater than 1, radiation direction patterns and lobe widths of different antenna units in the antenna system 100 may be same or different, which is not limited specifically herein.

In addition, when the number of antenna units 101 in the antenna system 100 is greater than 1, working frequency segments of antennas in different antenna units in the antenna system 100 may belong to a same frequency segment or different frequency segments, which is not limited specifically herein.

In the present disclosure, when the antenna system 100 includes N antenna units and N is greater than 1, the control apparatus 200 may control the N antenna units simultaneously provided that the rotation instruction from the external control device 300 carries identifiers of antenna units to be controlled to ensure that the control apparatus 200 controls a corresponding antenna unit specifically.

In FIG. 1 or FIG. 2, the control apparatus 200 may include a motor.

Figure 3:
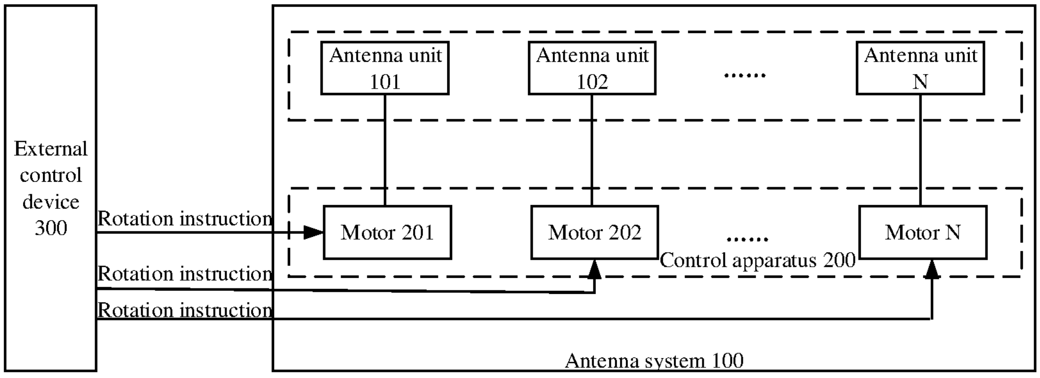
FIG. 3 is a schematic diagram illustrating a connection structure of a motor and an antenna unit in an antenna system 100 according to an example of the present disclosure.

In an example, the number of motors is equal to the number of antenna units. Each motor is connected with one antenna unit to drive the connected antenna unit to rotate. FIG. 3 illustrates a connection structure of the motor and the antenna unit in the antenna system 100 with the antenna unit shown in FIG. 2 as an example.

In a specific implementation, each motor is connected with one antenna unit, which specifically refers to that a rotation shaft of each motor is fixedly connected with one antenna unit. In an example, the rotation shaft of each motor may be fixedly connected with one antenna unit through a retention structure. The retention structure herein may be, for example, a nail, and the like.

In an example, each motor controls the rotation shaft of the motor to rotate according to the received rotation instruction, so as to drive the antenna unit fixedly connected with the rotation shaft to rotate to a target angle. In the present disclosure, after the rotation shaft of each motor is fixedly connected with one antenna unit, each motor may control the rotation shaft to rotate upon receiving the rotation instruction. Since the rotation shaft is fixedly connected with one antenna unit, when the motor controls the rotation shaft to rotate, the rotation shaft drives the antenna unit fixedly connected with the rotation shaft to rotate. Thus, the rotation of the antenna unit is controlled finally.

It is to be noted that, in an example of the present disclosure, the above motor may be a stepping motor during a specific implementation. Based on this, the above rotation instruction carries a rotation direction and the number of rotation steps. Upon receiving the rotation instruction, each motor may control the rotation shaft to rotate according to the rotation direction and the number of rotation steps carried in the rotation instruction, so that the antenna unit fixedly connected with the rotation shaft is driven to rotate to the target angle corresponding to the number of rotation steps.

As described above, the antenna unit is driven to rotate by the rotation shaft of the motor. The motor itself does not determine a current location of the antenna unit. Further, even if an initial location of the antenna unit is determined, errors may be accumulated due to long-term rotation of the rotation shaft of the motor. In addition, an error may also be caused by abnormal operation, such as power failure. Therefore, to facilitate calibrating the location of the antenna unit, at least one limiting structure corresponding to the antenna unit may be disposed on a rotation path of the antenna unit.

In an example, each antenna unit corresponds to two limiting structures. Each limiting structure may change a state when detecting a limiting event. The limiting event may at least include that, the limiting structure touches the antenna unit and a distance between the limiting structure and the antenna unit satisfies a preset condition. The condition herein may be preset according to actual situations.

Figure 4:
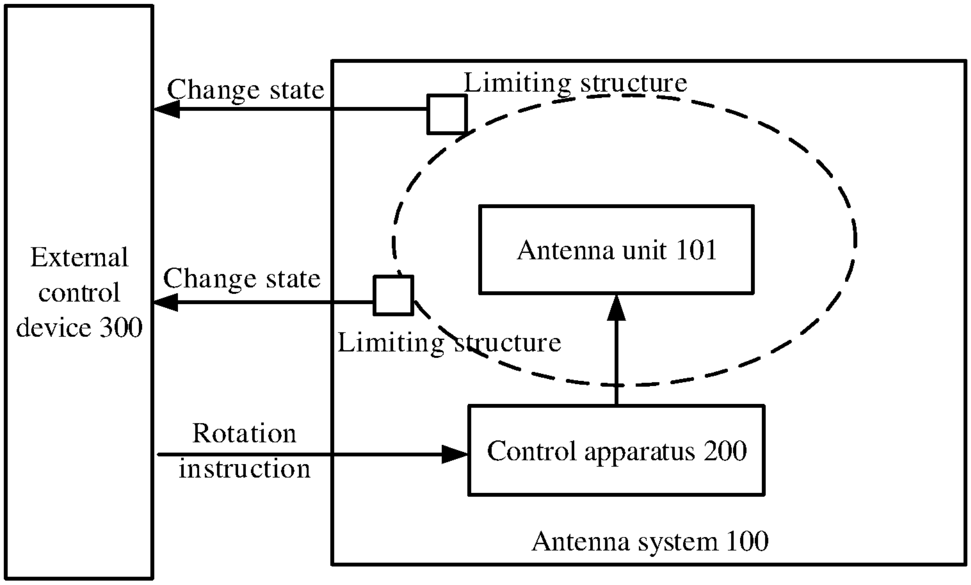
FIG. 4 is a schematic diagram illustrating a connection structure of two limiting structures corresponding to an antenna unit 101 in an antenna system 100 and an external control device according to an example of the present disclosure.
Figure 5:
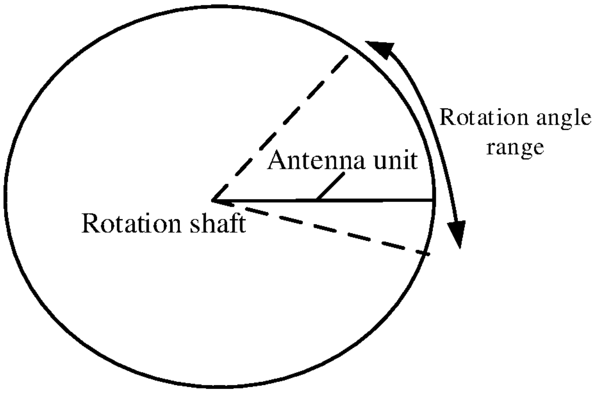
FIG. 5 is a schematic diagram illustrating a rotation angle range of an antenna according to an example of the present disclosure.

In the present disclosure, the limiting structures corresponding to the antenna unit are connected with the above external control device 300. FIG. 4 illustrates a connection structure of two limiting structures corresponding to the antenna unit 101 in the antenna system 100 and the external control device 300 according to an example of the present disclosure. After the limiting structures are disposed on the rotation path of the antenna unit 101, the locations for disposing the limiting structures may be recorded in the external control device 300. When detecting that state of any limiting structure changes, the external control device 300 may determine the current location of the antenna unit based on the location of the limiting structure state of which changes. In this way, the calibration of the location of the antenna unit is realized.

It is to be noted that, in the present disclosure, when detecting that the state of the limiting structure changes, the external control device 300 may further generate a control instruction and send the control instruction to the control apparatus connected with the antenna unit corresponding to the limiting structure, where the control instruction is used to prevent the antenna unit from continuing rotating along an original rotation direction after the limiting event. Through the control instruction, the antenna unit can be prohibited from continuing rotating along the original rotation direction after reaching the limiting structure, thereby avoiding damage to the antenna unit.

In the present disclosure, the antenna unit (for example, the antenna unit 101 shown in FIG. 1) is not rotated within a range of 360 degrees (which is also unnecessary in an actual application), and the rotation angle of the antenna unit is limited by a physical space and a control accuracy of the motor. Based on this, the rotation angle range of the antenna unit may be preset according to the physical space and the control accuracy of the motor in the present disclosure, so that the antenna unit is rotated within the preset rotation angle range. For example, the rotation angle is not more than 45 degrees, and the rotation accuracy is about 1 degree. FIG.

5 illustrates a rotation angle range of an antenna according to an example of the present disclosure.

In an example, based on the rotation angle range of the antenna, disposing the limiting structures corresponding to the antenna unit on the rotation path of the antenna unit as described above specifically refers to that, one of the limiting structures corresponding to the antenna unit is disposed at a location corresponding to a maximum angle in a preset rotation angle range of the antenna unit, and the other limiting structure is disposed at a location corresponding to a minimum angle in the preset rotation angle range. In a specific implementation, for example, the location corresponding to the minimum angle in the above preset rotation angle range refers to an initial location where the antenna unit does not start to rotate.

In an example, the above limiting structure may be a limiting switch. The limiting switch may specifically be a contact switch or a non-contact switch. When the limiting switch is a contact switch, if the antenna unit touches the limiting switch, the state of the limiting switch may change, for example, from an original first state to a second state; when the limiting switch is a non-contact switch (such as a reed switch, a photoelectric switch and a sensing switch), if the limiting switch senses the antenna unit within a preset distance, the state of the limiting switch may change.

The antenna system according to the present disclosure is described above, and a network device to which the antenna system according to the present disclosure is applied is described below.

Figure 6:
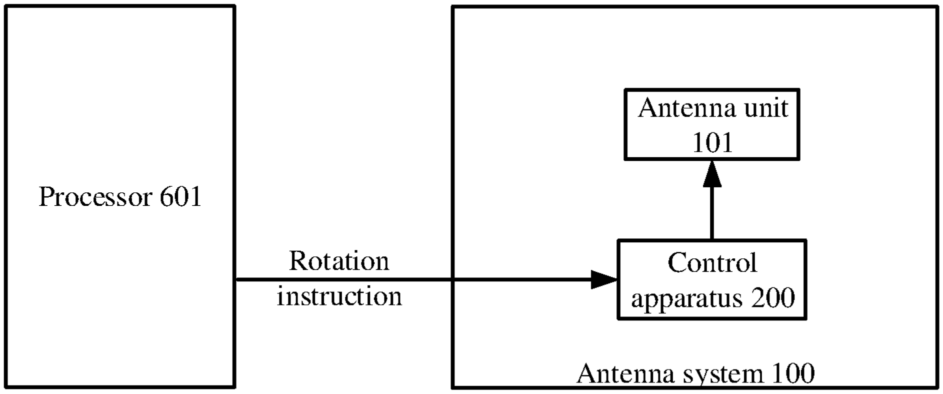
FIG. 6 is a schematic diagram illustrating a structure of a network device according to an example of the present disclosure.

FIG. 6 is a schematic diagram illustrating a structure of a network device according to an example of the present disclosure. In a specific implementation of the present disclosure, the network device may be an AP.

The network device shown in FIG. 6 mainly includes a processor 601 and the above antenna system 100.

The processor 601, as an external control device of the antenna system 100, is connected with the antenna system 100, and configured to send a rotation instruction to a control apparatus in the antenna system 100.

The control apparatus 200 in the antenna system 100 is connected with the antenna unit 101, and configured to receive the rotation instruction from the processor 601, and control the antenna unit 101 to rotate to a target angle according to the received rotation instruction.

In a specific implementation, the processor 601 calculates the target angle to which each antenna unit needs to rotate based on a specified algorithm according to parameters associated with a radiation direction of each antenna unit 101 in the antenna system 100. Then, target angle information is carried in the rotation instruction and sent to the control apparatus 200 in the antenna system 100, so that the control apparatus 200 controls the antenna unit 101 to rotate to the target angle according to the received rotation instruction.

In an example, the above parameters include but not limited to, a signal strength, a channel occupation rate, a signal-to-noise ratio, the number of served terminals, and the like.

In an example, the above specified algorithm may be similar to a switching algorithm of the beam switching antenna.

Thus, the description of the structure of the network device shown in FIG. 6 is completed.

In the present disclosure, as described above, the antenna system 100 further includes a limiting structure corresponding to each antenna unit.

In the present disclosure, the processor 601 is connected with the limiting structure corresponding to the antenna unit. When detecting that the state of the limiting structure changes, the processor 601 determines the current location of the antenna unit based on the location of the limiting structure the state of which changes to realize the calibration of the location of the antenna unit.

Further, in the present disclosure, when detecting that the state of the limiting structure changes, the processor 601 also generates a control instruction and sends the control instruction to the control apparatus connected with the antenna unit corresponding to the limiting structure, where the control instruction is used to prevent the antenna unit from continuing rotating along the original rotation direction after the limiting event. Through the control instruction, the antenna unit can be prohibited from continuing rotating along the original rotation direction after reaching the limiting structure, thereby avoiding damage to the antenna unit.

Figure 7:
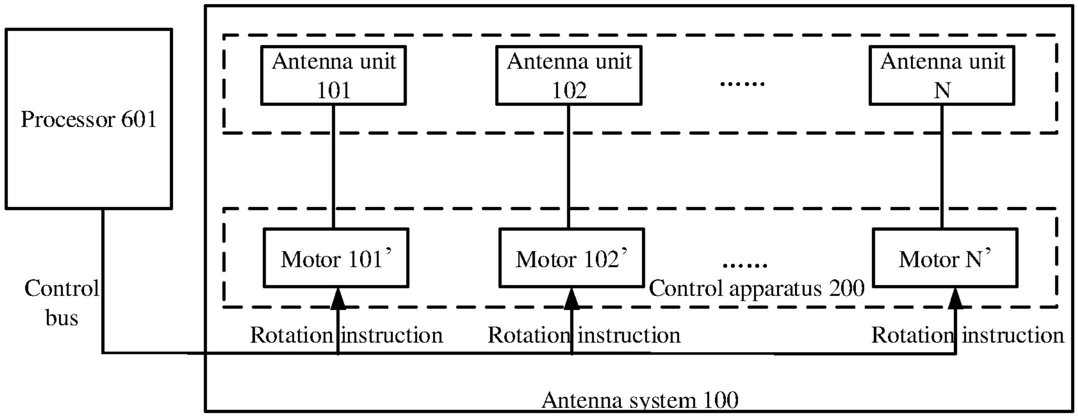
FIG. 7 is a schematic diagram illustrating a connection of a processor 601 and a motor in a network device according to an example of the present disclosure.

In the present disclosure, the processor 601 is connected with the control apparatus 200 in the antenna system 100 through a control bus to send the rotation instruction to the control apparatus 200 through the control bus. The control apparatus 200 in the antenna system 100 includes a motor. For example, the number of motors is equal to the number of antennas. FIG. 7 is a schematic diagram illustrating a connection of the processor 601 and the motor in the network device according to an example of the present disclosure.

How to control a plurality of radiation directions of the antenna in the network device of the present disclosure is described below through a specific example.

Figure 8:
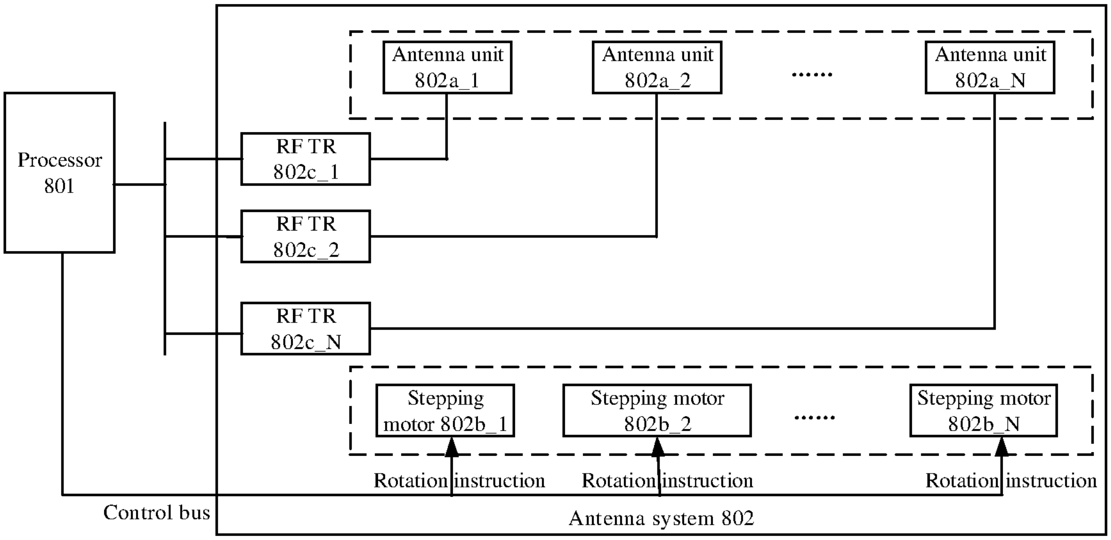
FIG. 8 is a schematic diagram illustrating a structure of a network device according to an example of the present disclosure.

FIG. 8 is a schematic diagram illustrating a structure of a network device according to an example of the present disclosure. As shown in FIG. 8, the network device may include a processor 801 and an antenna system 802. The processor 801 may be CPU 801.

In FIG. 8, the antenna system 802 includes N antenna units (802*a*_1 to 802*a*_N) and N stepping motors (802*b*_1 to 802*b*_N). In the antenna system 802, a rotation shaft of each stepping motor is fixedly connected with one antenna unit.

In an example, the network device may further include N radio frequency transceiving units (shown by RF TR in FIG. 8) (803*c*_1 to 802*c*_N). One end of each radio frequency transceiving unit is connected with the processor 801, and the other end is connected with one corresponding antenna unit in the antenna system 802 through a radio frequency cable, and configured to forward antenna information between the processor 801 and the antenna unit.

The antenna unit 802*a*_1 is taken as an example, and the principles of other antenna units are similar.

The processor 801 collects parameters associated with a radiation direction of the antenna unit 802*a*_1. In an example, the parameters herein include but not limited to, a signal strength, a channel occupation rate, a signal-to-noise ratio, the number of served terminals, and the like.

The processor 801 calculates a rotation direction (such as a clockwise direction or a counterclockwise direction) and the number of rotation steps for the antenna unit 802*a*_1 based on a specified algorithm according to the collected parameters. In an example, the above specified algorithm may be similar to a switching algorithm of the beam switching antenna.

The processor 801 carries the rotation direction and the number of rotation steps in the rotation instruction and sends the rotation instruction to the stepping motor 802*b*_1.

The stepping motor 802*b*_1 receives the rotation instruction and controls the rotation shaft to rotate according to the rotation direction and the number of rotation steps carried in the rotation instruction. Usually, the rotation angle corresponding to each step of the stepping motor is fixed. For example, the rotation angle corresponding to one step is 2 degrees. If the rotation is in the clockwise direction and the number of rotation steps is 5, it indicates that the stepping motor **802*b*_1** controls the rotation shaft to rotate 10 degrees clockwise.

The antenna unit **802*a*_1 is fixedly connected with the rotation shaft of the stepping motor 802*b*_1. When the stepping motor 802*b*_1 controls the rotation shaft to rotate, the antenna unit 802_1 is driven to rotate. For example, when the stepping motor 802*b*_1 controls the rotation shaft to rotate 10 degrees clockwise, the antenna unit 802_1** is driven to rotate 10 degrees clockwise.

The rotation of the antenna unit **802*a*_1 may change the radiation direction of the antenna unit 802*a*_1. In this way, the multi-angle control of the radiation direction of the antenna unit 802*a*_1** is realized, thereby achieving the effect of the smart antenna.

Since the stepping motor may change the radiation direction of the antenna unit **802*a*_1 by controlling the antenna unit to rotate, so as to realize a plurality of radiation directions of the antenna unit. The above descriptions are made with the antenna unit 802*a*_1** as an example, and the principles of other antenna units are similar and therefore will not be described in detail herein.

Thus, the description of this example is completed.

The foregoing disclosure is merely illustrative of preferred examples of the present disclosure and not intended to limit the present disclosure. Any modifications, equivalent substitutions and improvements made within the spirit and principles of the present disclosure shall be encompassed in the scope of protection of the present disclosure.

The invention claimed is:

1. An antenna system, comprising:

at least one antenna unit, a control apparatus configured to control the at least one antenna unit to rotate, and at least one limiting structure corresponding to each antenna unit, disposed on a rotation path of the antenna unit to calibrate a location of the antenna unit, wherein:

the control apparatus is connected with the at least one antenna unit and an external control device, and configured to receive a rotation instruction from the external control device, and control the at least one antenna unit to rotate to a target angle according to the received rotation instruction, any of the at least one limiting structure changes its state when a limiting event is detected; the limiting event at least comprises that, the at least one limiting structure touches a corresponding antenna unit, and a distance between the at least one limiting structure and the corresponding antenna unit satisfies a preset condition, the at least one limiting structure is connected with the external control device so that the external control device, when detecting that any of the at least one limiting structure changes its state, determines a current location of the antenna unit corresponding to the limiting structure based on a location of the limiting structure whose state changes, generates a control instruction, and sends the control instruction to the control apparatus connected with the antenna unit corresponding to the limiting structure, wherein the control instruction is used to prevent the antenna unit from continuing rotating along an original rotation direction after the limiting event.

2. The antenna system according to claim 1, wherein the control apparatus comprises at least one motor;

the number of the at least one motor is equal to the number of the at least one antenna unit, and each motor is connected with one antenna unit to drive the connected antenna unit to rotate.

3. The antenna system according to claim 2, wherein a rotation shaft of each motor is fixedly connected with one antenna unit;

each motor controls the rotation shaft of the motor to rotate according to the received rotation instruction so as to drive the antenna unit fixedly connected with the rotation shaft of the motor to rotate to the target angle.

4. The antenna system according to claim 2, wherein the motor is a stepping motor;

the rotation instruction carries a rotation direction and a number of rotation steps; and the target angle is an angle corresponding to the number of rotation steps.

5. The antenna system according to claim 1, wherein each antenna unit comprises one antenna applied to Single-Input Single-Output (SISO) system or a plurality of antennas applied to Multiple-Input Multiple-Output (MIMO) system.

6. The antenna system according to claim 1, wherein in a case that each antenna unit corresponds to two limiting structures, one of the limiting structures is disposed at a location corresponding to a maximum angle in a preset rotation angle range of the antenna unit, and another limiting structure is at a location corresponding to a minimum angle in the preset rotation angle range.

7. A network device, comprising:

the antenna system according to claim 1, a processor, as an external control device of the antenna system, is connected with the antenna system, and configured to send a rotation instruction to a control apparatus in the antenna system.

8. The network device according to claim 7, wherein for each antenna unit, the processor is configured to collect parameters associated with the antenna unit, determine a target angle to which the antenna unit needs to rotate based on a specified algorithm according to the parameters, and send the target angle carried in the rotation instruction to the control apparatus connected with the antenna unit, wherein the parameters are related to a radiation direction of the antenna unit.

9. The network device according to claim 7, wherein when detecting that a limiting structure corresponding to one antenna unit in the antenna system changes its state, the processor is configured to determine a location of a corresponding antenna unit according to a location of the limiting structure whose state changes.

10. The network device according to claim 9, wherein when detecting that the limiting structure corresponding to one antenna unit in the antenna system changes state, the processor is further configured to generate a control instruction and send the control instruction to the control apparatus connected with the antenna unit in the antenna system, wherein the control instruction is used to prevent the antenna unit from continuing rotating along an original rotation direction after the limiting event.

* * * * *